US007016670B2

(12) United States Patent
Agin

(10) Patent No.: US 7,016,670 B2
(45) Date of Patent: Mar. 21, 2006

(54) LINK ADAPTATION METHOD FOR USE IN A MOBILE RADIOCOMMUNICATION SYSTEM

(75) Inventor: Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 645 days.

(21) Appl. No.: 09/981,715

(22) Filed: Oct. 19, 2001

(65) Prior Publication Data

US 2002/0068560 A1 Jun. 6, 2002

(30) Foreign Application Priority Data

Oct. 20, 2000 (FR) .................................. 00 13480

(51) Int. Cl.
*H04Q 7/20* (2006.01)
*H04B 17/00* (2006.01)

(52) U.S. Cl. ....................... 455/423; 455/9; 455/67.11; 455/67.13; 455/63.1

(58) Field of Classification Search ................ 455/423, 455/9, 67.11, 67.13, 63.1, 10, 102, 108, 114.2, 455/115.1, 115.3, 135, 424, 63
See application file for complete search history.

(56) References Cited

U.S. PATENT DOCUMENTS

| | | | | |
|---|---|---|---|---|
| 5,406,593 A | * | 4/1995 | Chennakeshu et al. | ..... 375/376 |
| 5,764,651 A | * | 6/1998 | Bullock et al. | ............. 714/708 |
| 6,157,830 A | * | 12/2000 | Minde et al. | ................ 455/424 |
| 6,320,918 B1 | * | 11/2001 | Walker et al. | .............. 375/346 |
| 6,341,224 B1 | * | 1/2002 | Dohi et al. | ................. 455/522 |
| 6,754,277 B1 | * | 6/2004 | Heinzelman et al. | .. 375/240.27 |

FOREIGN PATENT DOCUMENTS

| | | |
|---|---|---|
| EP | 0 899 906 A2 | 3/1999 |
| EP | 0 903 883 A2 | 3/1999 |
| EP | 0 944 201 A2 | 9/1999 |

OTHER PUBLICATIONS

Kleider J E et al.: "An Adaptive-Rate Anti-Jam System for Optimal Voice Communication" Milcom Conference Record, XX, XX, 1997, pp. 1103-1107.

* cited by examiner

*Primary Examiner*—Rexford N. Barnie
(74) *Attorney, Agent, or Firm*—Sughrue Mion, PLLC

(57) ABSTRACT

A method of link adaptation in a mobile radiocommunication system includes selecting a coding and/or modulation scheme as a function of radio conditions represented by an average of radio measurement results. The average includes an average over a relatively short period for rapidly selecting a more rugged coding and/or modulation scheme if radio conditions are degraded rapidly, or an average over a relatively longer period for selecting a less rugged coding and/or modulation scheme or a more rugged coding and/or modulation scheme if radio conditions are not rapidly degraded.

21 Claims, 2 Drawing Sheets

| CSi | $CS_i \rightarrow CS_{i+1}$ | $CS_i \rightarrow CS_{i-1}$ |
|---|---|---|
| CS1 | AV_RXQUAL_LT < CS_QUAL_UL_1_2 | Impossible |
| CS2 | AV_RXQUAL_LT < CS_QUAL_UL_2_3 | AV_RXQUAL_LT > CS_QUAL_UL_1_2 + CS_HST_UL_LT OR AV_RXQUAL_ST > CS_QUAL_UL_1_2 + CS_HST_UL_ST |
| CS3 | AV_RXQUAL_LT < CS_QUAL_UL_3_4 | AV_RXQUAL_LT > CS_QUAL_UL_2_3 + CS_HST_UL_LT OR AV_RXQUAL_ST > CS_QUAL_UL_2_3 + CS_HST_UL_ST |
| CS4 | Impossible | AV_RXQUAL_LT > CS_QUAL_UL_3_4 + CS_HST_UL_LT OR AV_RXQUAL_ST > CS_QUAL_UL_3_4 + CS_HST_UL_ST |

FIG_1

| CSi | CSi --> CSi+1 | CSi --> CSi-1 |
|---|---|---|
| CS1 | AV_RXQUAL_LT<CS_QUAL_UL1_2 | Impossible |
| CS2 | AV_RXQUAL_LT<CS_QUAL_UL2_3 | AV_RXQUAL_LT>CS_QUAL_UL_1_2+CS_HST_UL_LT OR AV_RXQUAL_ST>CS_QUAL_UL_1_2+CS_HST_UL_ST |
| CS3 | AV_RXQUAL_LT<CS_QUAL_UL3_4 | AV_RXQUAL_LT>CS_QUAL_UL_2_3+CS_HST_UL_LT OR AV_RXQUAL_ST>CS_QUAL_UL_2_3+CS_HST_UL_ST |
| CS4 | Impossible | AV_RXQUAL_LT>CS_QUAL_UL_3_4+CS_HST_UL_LT OR AV_RXQUAL_ST>CS_QUAL_UL_3_4+CS_HST_UL_ST |

FIG_2

| CSi | CSi → CSi+1 | CSi → CSi-1 |
|---|---|---|
| CS1 | AV_RXQUAL_LT<CS_QUAL_DL_1_2 | Impossible |
| CS2 | AV_RXQUAL_LT<CS_QUAL_DL_2_3 | AV_RXQUAL_LT>CS_QUAL_DL_1_2+CS_HST_DL_LT<br>OR<br>AV_RXQUAL_ST>CS_QUAL_DL_1_2+CS_HST_DL_ST |
| CS3 | AV_RXQUAL_LT<CS_QUAL_DL_3_4<br>AV_SIR>CS_SIR_DL_3_4 | AV_RXQUAL_LT>CS_QUAL_DL_2_3+CS_HST_DL_LT<br>OR<br>AV_RXQUAL_ST>CS_QUAL_DL_2_3+CS_HST_DL_ST |
| CS4 | Impossible | AV_SIR<CS_SIR_DL_3_4+CS_SIR_HST_DL |

LINK ADAPTATION METHOD FOR USE IN A MOBILE RADIOCOMMUNICATION SYSTEM

CROSS-REFERENCE TO RELATED APPLICATIONS

This application is based on French Patent Application No. 00 13 480 filed Oct. 20, 2000, the disclosure of which is hereby incorporated by reference thereto in its entirety, and the priority of which is hereby claimed under 35 U.S.C. § 119.

BACKGROUND OF THE INVENTION

1. Field of the Invention

The present invention relates generally to mobile radiocommunication systems.

2. Description of the Prior Art

Errors can occur in mobile radiocommunication systems when estimating data on reception, caused mainly by distortion of the transmitted signal due to multipath propagation, thermal noise and all the various sources of interference.

Redundancy is generally added to enable the receiver to retrieve the information bits transmitted, i.e. more than one bit is transmitted for each information bit. This technique is known as channel coding and the quantity of redundancy, defined as the ratio of the number of information bits to the number of bits transmitted, is referred to as the coding rate. The coding rate is therefore a number from 0 to 1, and the smaller the number, the greater the quantity of redundancy.

In the case of data transmission, it is necessary for each information bit to be received correctly. However, even for low coding rates and high transmission powers, errors are always possible on reception in the case of severe radio conditions. Another technique, known as the Automatic Repeat reQuest (ARQ) technique, is used in addition to the channel coding technique. It simply consists of retransmitting blocks of information bits that have not been received correctly by the receiver until they are received correctly. The proportion of blocks retransmitted is referred to as the BLock Erasure Rate (BLER) and depends to a significant degree on the coding rate (the BLER is an increasing function of the coding rate).

Thus the channel coding technique and the ARQ technique enable data to be received correctly in all radio conditions. However, a main drawback of these techniques is that they use some of the radio resources for a purpose other than increasing the net bit rate. The net bit rate is the bit rate obtained after deducting from the raw bit rate (the bit rate actually transmitted at the radio interface) everything that is not useful to the user, such as the redundancy introduced by the coding or the blocks not received correctly.

To maximize the net bit rate, it is therefore necessary to optimize the coding rate. This optimization is not a simple matter, since the relationship between the BLER and the coding rate is highly dependent on radio conditions. If radio conditions are poor, a low coding rate is preferable to avoid an excessively high number of retransmissions. In contrast, if radio conditions are good, a high coding rate is sufficient and produces a high net bit rate.

A plurality of coding schemes with different coding rates are necessary to obtain a net bit rate optimized for all radio conditions. They enable the coding rate to be adapted dynamically as a function of radio conditions. Thus a more rugged coding scheme (i.e. one having a lower coding rate) can be selected if radio conditions are degraded or, conversely, a less rugged coding scheme (i.e. one having a higher coding rate) can be selected if radio conditions improve. This technique is known as link adaptation.

For example, the GSM (Global System for Mobile Communication) standard specifies four coding schemes for the General Packet Radio Service (GPRS). The four coding schemes are denoted CS1 to CS4 and have coding rates from 0.5 to 1.

The link adaptation technique can also be used for dynamic adaptation of parameters of the system other than the coding rate, for example the modulation spectral efficiency (i.e. the capacity of the modulation to transmit a larger or smaller number of bits per symbol for the same allocated frequency band). Thus a more efficient but less rugged modulation scheme can be selected if radio conditions are degraded or, conversely, a more efficient but less rugged modulation scheme can be selected if radio conditions improve.

The link adaptation technique can also be applied to a combination of coding and modulation schemes. For example, the GSM standard specifies nine coding and modulation schemes MCS1 to MCS9 for the Enhanced General Packet Radio Service (EGPRS).

In the case of speech transmission, the link adaptation technique can also be applied to a combination of channel coding and speech coding (or source coding) schemes. This technique is known as the Adaptive Multi-Rate (AMR) technique.

Radio conditions are generally represented by a radio criterion, or quality indicator, such as in particular the raw Bit Error Rate (BER), the BLock Erasure Rate (BLER), the Signal-to-Interference Ratio (SIR), etc.

The theory of link adaptation is generally based on a system of N−1 ordered thresholds $S_1$ to $S_{N-1}$, where N is the number of coding and/or modulation schemes $C_1$ to $C_N$. These thresholds are called decision thresholds, and are defined so that, if the radio criterion used is between the thresholds $S_i$ and $S_{i+1}$, (where i is from 1 to N−2), the coding and/or modulation scheme $C_i$ is selected. If the radio criterion employed is below the threshold $S_1$, the coding and/or modulation scheme $C_1$ is selected. If the radio criterion employed is above the threshold $S_{N-1}$, the coding and/or modulation scheme $C_N$ is selected.

The radio criterion is generally obtained by measurements referred to as radio measurements. The results of a plurality of successive measurements are generally averaged to obtain a more accurate value for the radio criterion.

However, using such means is not without its drawbacks. Adaptation is then slower (because the average does not depend only on the result of the most recent measurement, but also on the results of preceding measurements). It is then very dangerous to average over too long a time period because the adaptation may then not be fast enough if radio conditions are degraded rapidly, and performance may then be significantly affected, i.e. quality can be significantly degraded, and there is even a risk of the call being cut off.

One object of the present invention is to avoid such drawbacks.

SUMMARY OF THE INVENTION

Thus the present invention provides a method of link adaptation in a mobile radiocommunication system, said method including selecting a coding and/or modulation scheme as a function of radio conditions represented by an average of radio measurement results, and said method being such that said average includes:

an average over a relatively short period for rapidly selecting a more rugged coding and/or modulation scheme if radio conditions are degraded rapidly, or an average over a relatively longer period for selecting a less rugged coding and/or modulation scheme or a more rugged coding and/or modulation scheme if radio conditions are not rapidly degraded.

According to another feature, said selection is based on a system of thresholds which have a first value for determining if radio conditions are degraded rapidly and a second value for determining if radio conditions are not degraded rapidly, said second value being relatively higher or relatively lower than said first value according to whether the value of said radio measurements increases or decreases when radio conditions are degraded.

According to another feature, said radio measurements include raw BER measurements.

According to another feature, said radio measurements include SIR measurements.

According to another feature, if one of said coding schemes has a coding rate equal to 1, said radio measurements for selecting a more rugged coding scheme from said coding scheme having a coding rate equal to 1 include measurements other than raw BER measurements.

According to another feature, if one of said coding schemes has a coding rate equal to 1, said radio measurements for selecting said coding scheme having a code rate equal to 1 from a more rugged coding scheme include raw BER measurements and measurements other than raw BER measurements.

According to another feature, said radio measurements other than raw BER measurements include SIR measurements.

According to another feature, said radio measurements other than raw BER measurements include received signal power level measurements.

According to another feature, when transmission resumes on said link to which said link adaptation is applied following an interruption of transmission, and if said measurements have not been effected during said interruption of transmission, said coding and/or modulation scheme that was being used before said interruption of transmission is used if said period of interruption is relatively short or a default coding and/or modulation scheme is used otherwise.

According to another feature, said default coding and/or modulation scheme is the most rugged coding and/or modulation scheme.

According to another feature, said average is obtained by means of an exponential filter defined by a forget factor parameter that is expressed directly as a function of the time period between two measurements or an approximation thereof.

According to another feature, said filter is defined by equations of the following type:

$$y_{n+1} = \alpha^{\Delta t_n} y_n + 1$$

$$AV\_M_{n+1} = \left(1 - \frac{1}{y_{n+1}}\right) AV\_M_n + \frac{1}{y_{n+1}} m_{n+1}$$

in which:

$AV\_M_{n+1}$, is the value of AV_M after an $(n+1)^{th}$ measurement $m_{n+1}$, $\Delta t_n$ designates the time interval between the $n^{th}$ measurement and the $(n+1)^{th}$ measurement, or an approximation of that time interval, and $\alpha$ is a parameter defining the filter.

The present invention also provides a mobile radiocommunication system including means for implementing the above kind of link adaptation method.

According to another feature, said link adaptation is applied to an uplink.

According to another feature, said link adaptation is applied to a downlink.

The present invention also provides a mobile radiocommunication network entity including means for implementing the above kind of link adaptation method.

According to another feature, said link adaptation is applied to an uplink.

According to another feature, said link adaptation is applied to a downlink.

The present invention also provides a mobile station including means for implementing the above kind of link adaptation method.

According to another feature, said link adaptation method is applied to a downlink.

According to another feature, said link adaptation method is applied to an uplink.

Other objects and features of the present invention will become apparent on reading the following description of embodiments of the invention, which description is given with reference to the accompanying drawings.

BRIEF DESCRIPTION OF THE DRAWINGS

FIG. 1 shows a first example of application of a method according to the invention.

FIG. 2 shows a second example of application of a method according to the invention.

DETAILED DESCRIPTION OF THE PREFERRED EMBODIMENTS

FIGS. 1 and 2 relate to the GPRS system, for example, and the schemes available are therefore the coding schemes CS1 to CS4 as defined in the GPRS system.

For example, FIG. 1 corresponds to uplink adaptation and FIG. 2 corresponds to downlink adaptation.

The method shown in FIGS. 1 and 2 is represented in the form of a table. The first column of the table indicates the current coding scheme $CS_i$ (with i from 1 to 4 in the example considered here of the GPRS system). The second column indicates the conditions for selecting the less rugged coding scheme $CS_{i+1}$ from the current coding scheme $CS_i$. The third column indicates the conditions for selecting the more rugged coding scheme $CS_{i-1}$ from the current coding scheme $CS_i$.

As previously indicated, radio conditions are generally represented by a radio criterion or quality indicator such as the raw Bit Error Rate (BER), the BLock Erasure Rate (BLER), the Signal-to-Interference Ratio (SIR), etc.

A radio criterion such as the raw BER or the SIR may be considered more appropriate for link adaptation since, in particular, and unlike the BLER, they do not depend on the coding scheme employed.

In a first embodiment, shown in FIGS. 1 and 2, the radio criterion is the raw BER whenever it is possible to use it. The corresponding radio measurements are denoted RXQUAL, which is the notation employed in GSM Recommendation 05.08 published by the ETSI. For measurements reported to the network by the mobile station, for example, the RXQUAL measurements are quantized using eight levels RXQUAL_0 to RXQUAL_7. The average of such measurement results RXQUAL is here denoted AV_RXQUAL.

For example, the uplink and downlink decision thresholds are different, the decision threshold used to select the coding scheme $CS_{i+1}$ from the coding scheme CS, on the basis of the measurements RXQUAL being denoted CS_QUAL_UL_i_i+1 for the uplink and CS_QUAL_DL_i_i+1 for the downlink.

For example, the decision threshold used to select the coding scheme $CS_i$ from the coding scheme $CS_{i+1}$ is different from the threshold used to select the coding scheme $CS_{i+1}$ from the coding scheme $CS_i$. This prevents the phenomenon of incessant changing between the coding schemes $CS_i$ and $CS_{i+1}$, which is known as the "ping-pong" phenomenon. In this instance, the decision threshold used to select the coding scheme $CS_i$ from the coding scheme $CS_{i+1}$ is obtained by adding to the decision threshold used for selecting the coding scheme $CS_{i+1}$ from the coding scheme $CS_i$ a hysteresis value which is generally denoted CS_HST_UL for the uplink and CS_HST_DL for the downlink.

In the example shown here, the hysteresis values are the same for the various decision thresholds. They could be different, however.

In accordance with the invention, and in this example for the average AV_RXQUAL, two averages are used:
- an average over a relatively short period, denoted AV_RXQAL_ST, for rapidly selecting a more rugged coding and/or modulation scheme if radio conditions are degraded rapidly, or
- an average over a relatively longer period, denoted AV_RXQUAL_LT, for selecting a less rugged coding and/or modulation scheme or a more rugged coding and/or modulation scheme if radio conditions are not rapidly degraded.

This is because:
- to select a less rugged coding scheme, it is necessary to ensure that radio conditions allow it over a sufficiently long time period, but
- on the other hand, if radio conditions are degraded rapidly, the average obtained over a shorter time period improves the responsiveness of the link adaptation algorithm, i.e. enables a more rugged coding scheme to be selected faster, to prevent performance being degraded.

One way of detecting if radio conditions are degraded rapidly or not, for faster selection of a more rugged coding scheme if radio conditions are degraded rapidly, is to compare the averages AV_RXQUAL_LT and AV_RXQUAL_ST to different decision thresholds. In the example shown here, those different decision thresholds are obtained by taking respective different hysteresis values CS_HST_UL_LT and CS_HST_UL_ST for the uplink (or CS_HST_DL_LT and CS_HST_DL_ST for the downlink), with in this instance CS_HST_UL_ST<CS_HST_UL_LT for the uplink (or CS_HST_DL_ST<CS_HST_DL_LT for the downlink).

Accordingly, in the examples shown, for the uplink:
the decision threshold for selecting the coding scheme $CS_i$ from the coding scheme $CS_{i+1}$, on the basis of the average AV_RXQUAL_ST, is denoted:
CS_QUAL_UL_i_i+1+CS_HST_UL_ST, and
the decision threshold for selecting the coding scheme $CS_i$ from the coding scheme $CS_{i+1}$, on the basis of the average AV_RXQUAL_LT is denoted:
CS_QUAL_UL_i_i+1 +CS_HST_UL_LT.

For the downlink, the expressions are of the same kind, substituting "DL" (signifying "DownLink") for "UL" (signifying "UpLink") in the expression for the thresholds.

Thus, as shown in FIG. 1 for the uplink:
the condition for selecting the coding scheme $CS_{i+1}$ from the coding scheme $CS_i$ can be written:
AV_RXQUAL_LT <CS_QUAL_UL_i_i+1,
the condition for selecting the coding scheme $CS_i$ from the coding scheme $CS_{i+1}$ can be written:
AV_RXQUAL_LT>CS_QUAL_UL_i_i+1+CS_HST_UL_LT
or
AV_RXQUAL_ST >CS_QUAL_UL_i_i+1+CS_HST_UL_ST.

The expressions for the downlink in FIG. 2 are of the same type, substituting "DL" for "UL" in the expression for the thresholds.

As previously indicated, in the examples shown in FIGS. 1 and 2, the radio criterion is the raw BER whenever it is possible to use it, the corresponding measurement results being denoted RXQUAL and the average of those measurements results being denoted AV_RXQUAL.

The raw BER is generally obtained by comparing the data received, prior to error correcting decoding, with corresponding data obtained after error correcting decoding and then recoded using the same error correcting code as is used on transmission.

Accordingly, in the example considered here of the GPRS system, in which the coding scheme CS4 has a coding rate equal to 1, RXQUAL measurements may not be possible if this coding scheme is used. In particular, RXQUAL measurements may not be possible if the measurements are effected in the mobile station, i.e. for downlink adaptation. If the measurements are effected in the network, i.e. for the case of uplink adaptation, other measurements can be effected (in particular measurements of the Bit Error Probability (BEP)), from which a raw BER estimate can be obtained. As a general rule, BEP measurements can be effected by the network and by the mobile station and thus made available for the uplink and downlink directions. For example, in the EGPRS system, the mobile station reports BEP measurements to the network (average MEAN_BEP and variance CV_BEP over four time slots forming a block RLC). BEP measurements are therefore available for the uplink and the downlink (the mobile station no longer effects the RXQUAL measurements and signals them to the network).

This is why, in the FIG. 1 example, which corresponds in particular to an uplink, the radio criterion consisting of the raw BER can be used in all cases. On the other hand, in the FIG. 2 example, which corresponds in particular to a downlink, another radio criterion is used when that is necessary. In the FIG. 2 example that other radio criterion is the SIR, the corresponding radio measurements here being denoted SIR and their average here being denoted AV_SIR. These radio measurements can be obtained from interference level measurements denoted I_LEVEL_TNi, to use the notation employed in GSM Recommendation 05.08, and from signal level measurements, denoted C-VALUE, which is the notation used in the same recommendation.

Another possibility would be to use the received signal power level (the corresponding radio measurements are denoted RXLEV in GSM Recommendation 05.08).

Thus, in the FIG. 2 example, in contrast to the FIG. 1 example, the conditions for selecting the coding scheme CS3 from the coding scheme CS4 are not based on the radio criterion consisting of the raw BER, but instead on the SIR.

In this case, if the conditions for selecting the coding scheme CS4 from the coding scheme CS3 were the same as in FIG. 1, i.e. were based on the radio criterion consisting of the raw BER, "ping-pong" phenomena could occur between CS3 and CS4, because the conditions could be realized simultaneously for a change from CS3 to CS4 and for a change from CS4 to CS3.

To avoid this kind of drawback, the condition for selecting the coding scheme CS4 from the coding scheme CS3 is based on the raw BER radio criterion and also on the SIR radio criterion.

Furthermore, in the example shown in FIG. 2:
the decision threshold used for selecting the coding scheme CS4 from the coding scheme CS3 on the basis of the SIR radio criterion is denoted CS_SIR_DL_3_4, and
the decision threshold used to select the coding scheme CS3 from the coding scheme CS4 on the basis of the SIR radio criterion is different, and is denoted CS_SIR_DL_3_4 +CS_SIR_HST_DL.

Accordingly, as shown in FIG. 2:
the condition for selecting the coding scheme CS4 from the coding scheme CS3 can be written:
AV_RXQUAL<CS_QUAL_DL_3_4
and
AV_SIR>CS_SIR_DL_3_4, and
the condition for selecting the coding scheme CS4 from the coding scheme CS3 can be written:
AV_SIR <CS_SIR_DL_3_4 +CS_SIR_HST_DL.

The SIR is another radio criterion that can be used in a second embodiment of the method according to the invention.

The second embodiment will not be described in more detail. It can be deduced from the first embodiment previously described, noting that:
in the first embodiment, the value of the radio measurements increases when radio conditions are degraded, whereas in the second embodiment the value of the radio measurements increases when the radio conditions improve; in this case, if the decision thresholds have a first value for determining if radio conditions are degraded rapidly and a second value for determining if radio conditions are not degraded rapidly, said second value is either relatively higher or relatively lower than said first value depending on whether the value of said radio measurements increases or decreases when radio conditions are degraded, and
in the second embodiment, SIR measurements are possible even if the coding scheme CS4 is used.

Other embodiments would be possible, of course.

Averages, such as AV_RXQUAL or AV_SIR, can be calculated in particular by means of an exponential filter. An exponential filter can be defined by the following equation:

$$S_n = (1-\beta) \cdot S_{n-1} + \beta \cdot m_n$$

in which $S_n$ is the actualized average value after the $n^{th}$ measurement $m_n$ and $\beta$ is a parameter of the filter (known as the forget factor).

An exponential filter can provide an average with weights decreasing exponentially with distance relative to the most recent measurement.

However, an exponential filter is exponential as a function of time only if the measurements are equally spaced in time. This condition is not always satisfied, which then makes it difficult to choose the parameter $\beta$, because this makes it necessary to have different values according to whether the measurements are more or less spaced in time.

In particular, in the example considered here of the GPRS system, an exponential filter can be used in the network for downlink adaptation, on the basis of radio measurements reported to the network by the mobile station. In particular, the mobile station reports an RXQUAL measurement to the network in an acknowledgement message "Packet Downlink Ack/Nack" that is not usually received periodically by the network. The time difference between these messages being received can be from a few hundred milliseconds up to a few seconds, for example.

An exponential filter as previously described but allowing for the time interval between two measurements is described in GSM Recommendation 05.08 published by the ETSI, and is modified by ETSI contribution SMG2 2-00-0035.

The latter document defines this kind of filter by means of the following two equations:

$$z_n = (1-\beta)z_{n-1} + \beta x_n$$

$$S_n = \left(1 - \beta \frac{x_n}{z_n}\right) \cdot S_{n-1} + \beta \frac{x_n}{z_n} \cdot m_n$$

in which $x_n$ is a variable intended to indicate if a radio measurement exists ($x_n$ is equal to 1 if a measurement exists or to 0 otherwise).

This kind of filter has the drawback, among others, of having to actualize the actual value even if no measurement is available, which therefore increases the complexity of implementation.

The present invention also provides a filter avoiding such drawbacks.

According to the invention, this result is essentially achieved by means of a filter whose forget factor is expressed directly as a function of the time interval between two measurements or an approximation of that time interval. For the average AV_RXQUAL_LT, for example, a filter according to the invention can be defined by the following equations:

$$y_{n+1} = \alpha_{LT}^{\Delta t_n} y_n + 1$$

$$AV\_RXQUAL\_LT_{n+1} = \left(1 - \frac{1}{y_{n+1}}\right) AV\_RXQUAL\_LT_n + \frac{1}{y_{n+1}} RXQUAL_n$$

Similarly, for the average AV_RXQUAL_ST, for example, a filter in accordance with the invention can be defined by the following equations:

$$z_{n+1} = \alpha_{ST}^{\Delta t_n} z_n + 1$$

$$AV\_RXQUAL\_ST_{n+1} = \left(1 - \frac{1}{z_{n+1}}\right) AV\_RXQUAL\_ST_n + \frac{1}{z_{n+1}} RXQUAL_n$$

In the above expressions:
AV_RXQUAL_ST$_n$ (respectively AV_RXQUAL_ST$_n$) is the value of AV_RXQUAL_ST (respectively AV_RXQUAL_LT) after the $n^{th}$ RXQUAL measurement (i.e. after the $n^{th}$ "Packet Downlink Ack/Nack" message in the GPRS system), RXQUAL$_n$ is the value of the $n^{th}$ RXQUAL measurement (i.e. the value of RXQUAL in the $n^{th}$ "Packet Downlink Ack/Nack" message in the GPRS system), and $\Delta t_n$ designates the time interval between the $(n-1)^{th}$ measurement and the $n^{th}$ measurement (i.e. between the $(n-1)^{th}$ "Packet Downlink Ack/Nack" message and the $n^{th}$ message in the GPRS system). $\Delta t_n$ could also designate an approximation of the time interval between two measurements. For example, $\Delta t_n$ could be approximated by a multiple of a particular time interval T (T being equal to a block period, for example, which is 20 ms in the GPRS and EGPRS systems). The real time interval may in fact not be an exact multiple of 20 ms because of movements of the mobile station, differences between the clocks of the mobile station and the network, etc.

Note that when $\alpha_{LT}=0$, no average is calculated and when $\Delta t_n = T_{LT}$ for any value of n (i.e. when the measurements are reported periodically with a period T), the usual equation $$AV\_RXQUAL\_LT_{n+1} = (1-\beta) AV\_RXQUAL\_LT_n + \beta \cdot RXQUAL_n$$

is approximately verified after an initialization phase (n sufficiently large). The same remarks apply for AV_RX-QUAL_ST.

To initialize the filters, $y_0$ and $z_0$ must be set to zero:

$$y_0 z_0 = 0$$

More generally, a filter for calculating an average AV_M is defined by equations of the following type:

$$y_{n+1} = \alpha^{\Delta t_n} y_n + 1$$

$$AV\_M_{n+1} = \left(1 - \frac{1}{y_{n+1}}\right) AV\_M_n + \frac{1}{y_{n+1}} m_{n+1}$$

in which:

AV_$M_{n+1}$ is the value of AV_M after an $(n+1)^{th}$ measurement $m_{n+1}$, $\Delta t_n$ designates the time interval between the nth measurement and the $(n+1)^{th}$ measurement, or an approximation of that time interval, and $\alpha$ is a parameter defining the filter.

Also, the present invention solves a different problem, which is related to the fact that if transmission is not continuous, but regularly interrupted, as is often the case in packet mode data transmission, it is possible for some of the measurements used to select a coding and/or modulation scheme to be impossible during periods in which transmission is interrupted. In particular, in the example previously described of the GPRS system, for the downlink, the RXQUAL measurements cannot be effected in the mobile station if transmission in the downlink direction is interrupted.

The problem that then arises is that of selecting a coding and/or modulation scheme when transmission resumes.

The skilled person knows of two solutions to this problem: for example, in the GPRS system, either a default coding scheme is used (such as the coding scheme CS1 which provides the highest level of protection) or measurements other than the RXQUAL measurements are used, which other measurements can be effected even if transmission is interrupted. Such measurements include SIR measurements effected on a control channel such as the Broadcast Control Channel (BCCH).

The essential drawback of using the coding mode CS1 is that it is not always possible to optimize the radio resources and therefore the net bit rate. Using SIR measurements effected on a control channel has the essential drawback of being insufficiently representative of the required measurements, in particular because the control channel does not have either the same power or the same frequency as the dedicated channel on which the RXQUAL measurements are effected if transmission is not interrupted.

The present invention also avoids these drawbacks.

The present invention essentially proposes, when transmission resumes after an interruption in transmission, using the coding and/or modulation scheme that was being used before the interruption if the interruption period is relatively short or a default coding and/or modulation scheme (such as, in particular, a coding and/or modulation scheme providing the highest level of protection) otherwise.

As a general rule, the method according to the invention can be used in a mobile radiocommunication system for uplink and/or downlink adaptation and can equally well be used in the network (or in one or more of the entities constituting the network) or in the mobile stations.

The entities constituting the network (also referred to herein as mobile radiocommunication network entities) can include such entities as:

a base station, for example a BTS (base transceiver station) or a Node B, depending on the systems used, a base station controller (BSC) or a radio network controller (RNC), for example, or Serving GPRS Support Nodes (SGSN) for the GPRS and EGPRS systems.

As a general rule, link adaptation is implemented in a functional entity called the Packet Channel Unit (PCU) in the GPRS and EGPRS systems and which can be located at the BTS, BSC or SGSN.

There is claimed:

1. A method of link adaptation in a mobile radiocommunication system, said method comprising:

calculating a first average of radio measurement results representing radio conditions over a relatively short period, or calculating a second average of radio measurement results representing radio conditions over a relatively longer period, and selecting a coding and/or modulation scheme based on said first or second average, wherein a more rugged coding and/or modulation scheme is selected based on said first average if radio conditions are degrading rapidly, or a more rugged coding and/or modulation scheme is selected based on said second average if radio conditions are not degrading rapidly, otherwise a less rugged coding and/or modulation scheme is selected based on said second average.

2. The method claimed in claim 1, wherein said selection is based on a first threshold value for determining if radio conditions have degraded rapidly and a second threshold value for determining if radio conditions have not degraded rapidly, said second threshold value being relatively higher or relatively lower than said first threshold value according to whether the value of said radio measurements increases or decreases when radio conditions are degraded.

3. The method claimed in claim 1 wherein said radio measurements include raw BER measurements.

4. The method claimed in claim 1 wherein said radio measurements include SIR measurements.

5. The method claimed in claim 1 wherein, if one of said coding schemes has a coding rate equal to 1, said radio measurements for selecting a more rugged coding scheme from said coding scheme having a coding rate equal to 1 include measurements other than raw BER measurements and said radio measurements for selecting said coding scheme having a code rate equal to 1 from a more rugged coding scheme include raw BER measurements and measurements other than raw BER measurements.

6. The method claimed in claim 5 wherein said radio measurements other than raw BER measurements include SIR measurements.

7. The method claimed in claim 5 wherein said radio measurements other than raw BER measurements include received signal power level measurements.

8. The method claimed in claim 1 wherein, when transmission resumes on said link to which said link adaptation is applied following an interruption of transmission, and if said measurements have not been effected during said interruption of transmission, said coding and/or modulation scheme that was being used before said interruption of transmission is used if said period of interruption is relatively short or a default coding and/or modulation scheme is used otherwise.

9. The method claimed in claim 8 wherein said default coding and/or modulation scheme is the most rugged coding and/or modulation scheme.

10. The method claimed in claim 1 wherein said average is obtained by means of an exponential filter defined by a forget factor parameter that is expressed directly as a function of the time period between two measurements or an approximation thereof.

11. The method claimed in claim 10, wherein said filter is defined by the following equations:

$$y_{n+1} = \alpha^{\Delta t_n} y_n + 1$$

$$AV\_M_{n+1} = \left(1 - \frac{1}{y_{n+1}}\right) AV\_M_n + \frac{1}{y_{n+1}} m_{n+1}$$

in which:
$AV\_M_{n+1}$ is the value of AV_M after an $(n+1)^{th}$ measurement $m_{n+1}$,
$\Delta t_n$ designates the time interval between the $n^{th}$ measurement and the $(n+1)^{th}$ measurement, or an approximation of that time interval, and
$\alpha$ is a parameter defining the filter.

12. A mobile radiocommunication network entity comprising means for implementing a link adaptation which comprises:
means for selecting a coding and/or modulation scheme as a function of radio conditions represented by an average of radio measurement results;
means for calculating an average over a relatively short period, wherein the average over a relatively short period is used for rapidly selecting a more rugged coding and/or modulation scheme if radio conditions are degraded rapidly; and
means for calculating an average over a relatively longer period, wherein the average over a relatively longer period is used for selecting a less rugged coding and/or modulation scheme, or a more rugged coding and/or modulation scheme if radio conditions are not rapidly degraded.

13. The entity claimed in claim 12 wherein said link adaptation is applied to an up link.

14. The entity claimed in claim 12 wherein said link adaptation is applied to a downlink.

15. A mobile station comprising means for implementing a link adaptation which comprises:
means for selecting a coding and/or modulation scheme as a function of radio conditions represented by an average of radio measurement results;
means for calculating an average over a relatively short period, wherein the average over a relatively short period is used for rapidly selecting a more rugged coding and/or modulation scheme if radio conditions are degraded rapidly; and
means for calculating an average over a relatively longer period, wherein the average over a relatively longer period is used for selecting a less rugged coding and/or modulation scheme, or a more rugged coding and/or modulation scheme if radio conditions are not rapidly degraded.

16. The mobile station claimed in claim 15 wherein said link adaptation method is applied to a downlink.

17. The mobile station claimed in claim 15 wherein said link adaptation method is applied to an uplink.

18. A method of link adaptation in a mobile radiocommunication system, said method comprising:
calculating a first average over a first period of time,
calculating a second average over a second period of time longer than said first period of time, and
selecting a coding and/or modulation scheme based on said first or second average, wherein a more rugged coding and/or modulation scheme is selected based on said first average if a predetermined condition is met, or a more rugged coding and/or modulation scheme is selected based on said second average if the predetermined condition is not met, otherwise a less rugged coding and/or modulation scheme is selected based on said second average.

19. The method claimed in claim 18 wherein said predetermined condition is that said radio conditions are degrading rapidly.

20. The method claimed in claim 18, wherein said predetermined condition is that said first average is less than said second average by more than a predetermined amount.

21. The method claimed in claim 18, wherein said method changes from using said first average to using said second average when said first average is worse than said second average by a first predetermined amount, and said method changes from using said second average to using said first average when said first average is worse than said second average by a second predetermined amount less than said first predetermined amount.

* * * * *